United States Patent [19]

Zimmermann et al.

[11] Patent Number: 4,472,182

[45] Date of Patent: Sep. 18, 1984

[54] APPARATUS FOR SEPARATING SUSPENDED MATERIALS SUCH AS ASH OR THE LIKE FROM STACK GASES

[75] Inventors: Adolf Zimmermann, Osterburken; Otmar Link, Buchen-Götzingen, both of Fed. Rep. of Germany

[73] Assignee: AZO-Maschinenfabrik Adolf Zimmermann GmbH, Osterburken, Fed. Rep. of Germany

[21] Appl. No.: 347,146

[22] Filed: Feb. 9, 1982

[30] Foreign Application Priority Data

Feb. 26, 1981 [DE]  Fed. Rep. of Germany ....... 3107226

[51] Int. Cl.³ ............................................. B01D 50/00
[52] U.S. Cl. ........................................ 55/319; 55/324; 55/337; 55/343
[58] Field of Search ................. 55/319, 324, 337, 343; 209/144

[56] References Cited

U.S. PATENT DOCUMENTS 2,836,256  5/1958  Caskey ............................. 55/324 X

FOREIGN PATENT DOCUMENTS 2433873  2/1975  Fed. Rep. of Germany ........ 55/337
931259   2/1948  France .................................. 55/343
737457   9/1955  United Kingdom .................. 55/337

*Primary Examiner*—Kathleen J. Prunner
*Attorney, Agent, or Firm*—Sandler & Greenblum

[57] ABSTRACT

In an apparatus for separating suspended particles, such as ash, from stack gas, consisting of a coarse separator, a take-up container for particles removed from suspension in the coarse separator, a fines separator for the partially-cleaned gas output of the coarse separator, and a stack for the cleaned gas output of the fines separator, a new arrangement is disclosed for maintaining the temperature of the dirty stack gas within the apparatus above its dew point so as to prevent the deposition of soot (sooting-up), such arrangement being the construction of the apparatus in such a way that the coarse separator, the fines separator and the outlet stack form an integral structural unit which sits upon the take-up container, which is supported by feet set upon a foundation. In such arrangement, the heat of the hot, suspended ashes deposited in the take-up container is transferred to the take-up container, and thence, to the elements of the integral structural unit. Thus, the heat content of the ash is transferred to the entire apparatus so that the temperature of the stack gas therein is maintained above the dew point.

11 Claims, 2 Drawing Figures

APPARATUS FOR SEPARATING SUSPENDED MATERIALS SUCH AS ASH OR THE LIKE FROM STACK GASES

BACKGROUND OF THE INVENTION

The present invention is with respect to an apparatus for separating suspended materials, such as ash or the like, from stack gases, made up of a cyclone-like coarse separator, a container for materials taken out of suspension from the gas, a fines separator on the outlet side and an outlet stack for the cleaned stack gas.

Such apparatus is more specially needed in connection with industrial combustion systems fired by solid fuel with the purpose of cleaning the stack gas to such a degree that amounts of noxious materials emitted into the outside air do not go up past limits fixed by public authorities.

The separate parts of the system—that is to say the coarse separator, the take-up container for the suspended material, the fines separator and the stack—are joined up by ducting, through which the stack gas makes its way at an above-atmospheric pressure. In such well known systems, more specifically in the separators and the ducting, there is a danger of sooting up (i.e., the deposition of soot from the dirty stack gas), especially upon shutting down the combustion system, when in fact the temperature in the system goes down under the dew point. For this reason, steps have to be taken for stopping sooting up and fouling, such as, more specifically, thermally insulating the parts of the system where trouble is likely, such as the separators and the ducting so that the heat coming from the stack gas, taken up by these parts, is stored, at least for a short time. Such measures naturally make the system more complex.

GENERAL OVERVIEW OF THE INVENTION

One purpose of the present invention is that of designing a system in which the danger of sooting up may be cut down without making the design any more complex.

For effecting this purpose, and further purposes, in the present invention the coarse separator, the take-up container, the fines separator and the stack are united together as a single-piece structure and the take-up container is designed as a support structure for all the parts.

With the design of the present invention, all the parts of the system are united as a one-part structure, taking up little space, the take-up container being designed as a support structure. Because hot suspended materials, such as fly ash and the like, come down in the take-up container, the same may be looked up on as a high-capacity heat store or accumulator, such heat from it then heating the other, single-unit parts of the system so that their temperature, and the temperature of stack gases making their way therethrough, does not go down under the dew point. The invention makes it possible to do this without any insulation.

Furthermore, the invention is responsible for a single-piece structure needing little space and which may be put up on a single foundation so that, in this respect as well, and furthermore because no ducting is needed between the separate parts of the system, the price becomes very much lower. Such a small-size, single-piece unit may be readily put together at the plant where it is needed and furthermore changed in design without any wide-ranging measures being necessary in connection with putting up the plant in the first place or making such later changes therein.

As part of one embodiment of the invention, the coarse separator takes the form of a cyclone tube and is placed in the middle of the take-up or collecting container so that there is a distribution of the suspended materials, coming out of suspension in the cyclone tube, evenly over the cross-section of the take-up container, the complete system then only needing one simple ash outlet system.

As part of a further embodiment of the invention, the fines separator is placed concentrically round the cyclone tube, its gas inlet face being higher than the outlet opening of the cyclone tube.

The cyclone tube is used not only for separating out the suspended materials, but furthermore as a quenching stage for red-hot suspended materials for stopping such particles making their way into the fines separator, which will generally be made of filter material. The effect of the cyclone tube as a quenching stage may be made even greater if the cyclone tube has a markedly greater diameter than the stack gas inlet tube opening thereinto, that is to say there is a jump in diameter, cutting back the speed of the stack gas. In connection with helical or spiral motion of the stack gas in the cyclone tube, the suspended materials will be kept for a relatively long time therein, or, in other words, there will be a long residence time, with the outcome that red-hot particles will be generally quenched completely on making their way through the cyclone tube.

As part of a preferred form of the invention, the stack is placed on the take-up container in the middle thereof and joined up by ducting with the cleaned gas end of the fines separator.

It may be seen from this that the take-up container is used as well as a support structure for the stack, this giving the useful effect that the emission height of the stack is equal to the height of the take-up container with the addition of the upright length of the stack thereon. Because the take-up container is, in any case, necessary, the height of the stack itself will be made less and its design will be less complex. For this reason, the height of the stack as fixed by public authorities, may be produced at a lower price.

A further useful effect is produced if the cyclone tube is designed with its lower portion situated within the take-up container and its upper portion extending to a greater height than the top wall of the take-up container and if the stack is placed on the cyclone tube, a separating wall being placed between the two. In this working example of the invention, the opening of the stack inlet duct into the cyclone tube will be right under the separating wall, and the opening of the cleaned gas ducts into the stack will be right over the separating wall.

As a last point, the cleaned gas ducts may be placed radially on the take-up container so as to be extending arcuately upwards and inwards towards the stack. However, in place of this design, it is naturally possible to have a direct connection between the part of the take-up container, in which the fines separator is housed, and the stack.

DETAILED ACCOUNT OF ONE EMBODIMENT OF THE INVENTION AND LIST OF FIGURES

An account will not be given of the invention shown in the embodiment seen in the figures.

The system is made up of a suspended material take-up container 1, a coarse separator 2, a fines separator 3 and a stack 4, which, as the reader will see from the figures, are united together as one single-piece structure.

Figure 2:
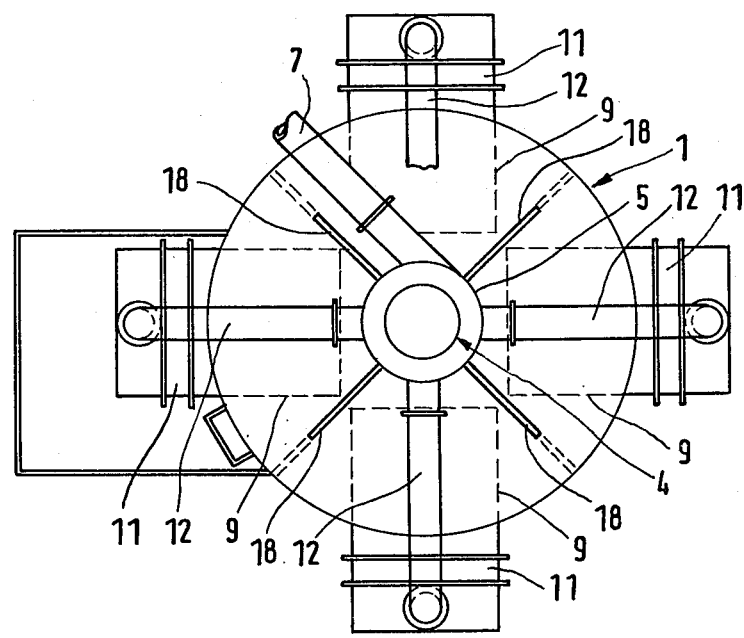
FIG. 2 is a plan view of the system of FIG. 1.

Coarse separator 2 is designed as cyclone tube 5 running through the top wall of the container 1. At the top of the cyclone tube 5 a duct 7 for stack gas will be seen to be placed opening tangentially (see FIG. 2) into the cyclone tube 5, tube 5 extending upwards in the middle part of the take-up container 1 over its top part and being open at its lower end 8. The fines separator 3 is placed concentrically around it, this separator in the present embodiment being made up of four separate separators 9, for example in the form of filter pockets. The stack gas inlet face or cross-section 10 of the fines separators 9 is at a higher level than the outlet opening 8 (or end) of the cyclone tube 5.

In each case one cleaned gas duct 12 is joined up with the cleaned gas end of the fines separators 9 by way of a header 11, ducts 12 being generally curved round over the top wall 6 of the take-up container 1 and joined up with the stack 4.

Figure 1:
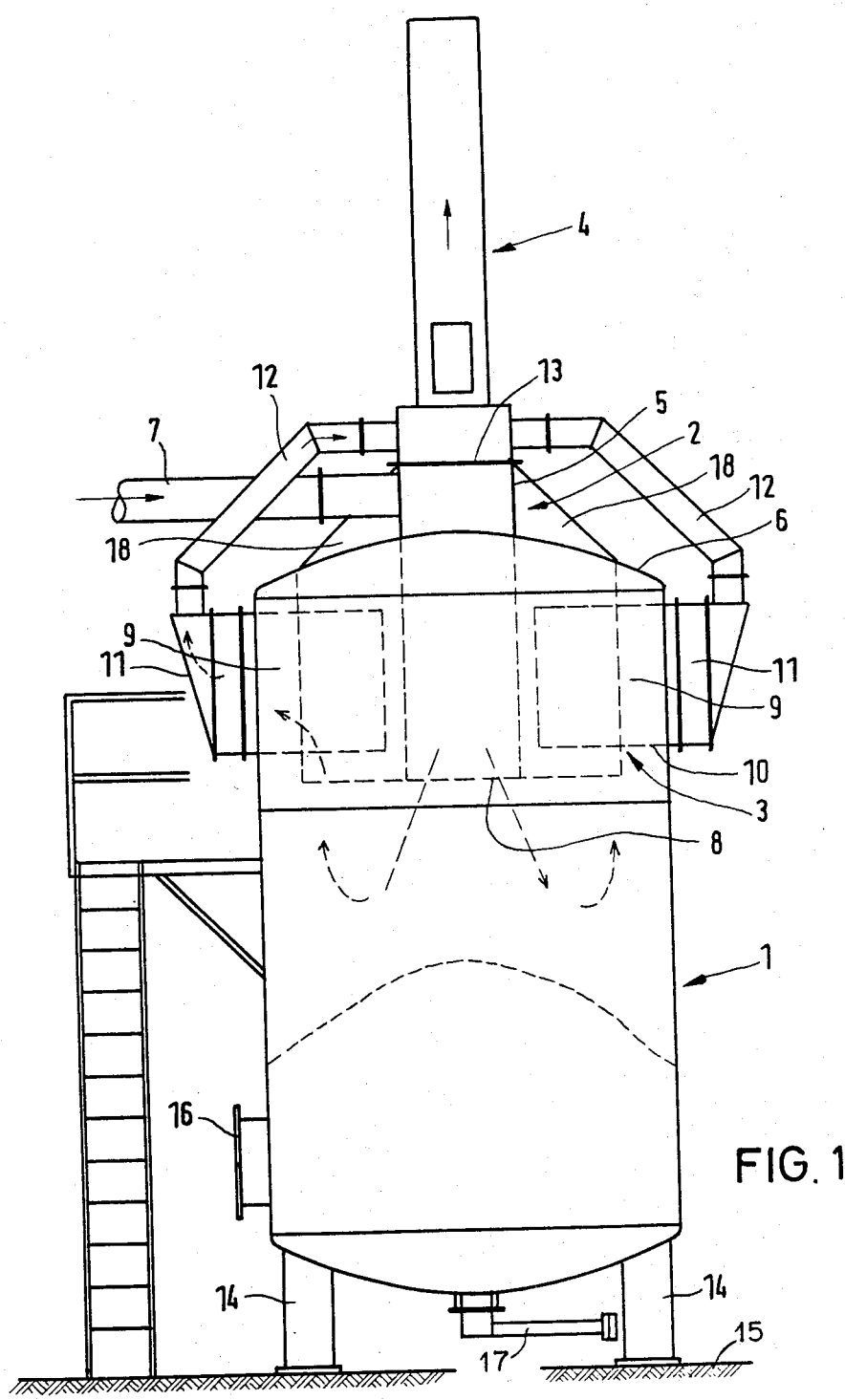
FIG. 1 is a side view of the system.

As will be seen from FIG. 1, the cyclone tube 5 is of such a height that the top end thereof is higher than the top wall 6 of the take-up container 1, stack 4 being placed right on this part of the cyclone tube 5 with a separating wall 13 between it and stack 4. Right under this point, there is the opening of the stack gas inlet duct 7 into the cyclone tube 5, while, immediately above separating wall 13, the cleaned gas ducts 12 are joined up with the stack 4.

The take-up container 1 for suspended materials—and for this reason the complete unit—is supported by way of feet 14 on a foundation 15 and in its lower part has an inspection opening 16 and an outlet system 17 for suspended materials.

The stack gas to be cleaned goes through inlet duct 7 into the cyclone tube 5, its speed going down because of the sharp increase or jump in diameter. Within the cyclone tube 5, the stack gas goes spiralling downwards heading for the outlet opening 8, most of the suspended materials coming out of suspension as this takes place, such materials falling then under their own weight onto the floor of the take-up container 1. Downstream from the outlet opening 8, the partially cleaned stack gas is changed in direction by 180° to make its way into the fines separators 10, such change in direction causing in fact a further separating effect with respect to particles in the stack gas. The fines or tailings of the suspended materials are then taken up and kept back in the fines separators 10. The cleaned stack gas makes its way by way of headers 11 and cleaned gas ducts 12 into stack 4, whose height, for emission purposes, is equal to its own upright length with the addition of the height of the container.

The weight of the cyclone tube 5 and, more importantly, of the stack 4 is taken up by way of corner plates 18, placed like the arms of a star so that the weight of tube 5 and stack 4 is squarely taken up by the wall of the take-up container 1 and then, by way of the supporting feet 14, by the foundation 15. If the stack 4 is of very great height, the supporting feet may furthermore be designed stretching out to the outside of the casing as well as far as the top wall 6 of the take-up container 1 so that the weight is taken up directly by the support feet themselves.

The length of the cyclone tube and the speed of the stack gases are so designed for that if the fines separators 9 are made of flammable material, the cyclone tube 5 is responsible for a long enough quenching stage. The fines separators 9 may furthermore have a known system for further cleaning of the gas and be so placed on the take-up container 1 that they may be taken off and new ones put in their place.

We claim:

1. An apparatus for the separation of suspended materials such as ashes or the like from stack gases, comprising a stack gas inlet duct opening into a cyclone-like coarse separator, a suspended-material take-up container, a fines separator and an outlet stack for cleaned stack gas, wherein said coarse separator, said fines separator, and said outlet stack are united as one structural unit and said take-up container is configured as a support for said entire structural unit; said coarse separator being configured as a cyclone tube placed in the center of said take-up container and having an outlet opening at its bottom; said fines separator being arranged concentrically around said cyclone tube; and said outlet stack being mounted upon a separating wall atop and covering said cyclone tube, and being connected through cleaned gas ducts with a cleaned gas end of said fines separator.

2. An apparatus as in claim 1 wherein said fines separator has a partially-cleaned stack gas inlet at a higher level than said outlet opening of said cyclone tube.

3. An apparatus as in claims 1 or 2, wherein said cyclone tube has a markedly larger diameter than the stack gas inlet duct opening into it.

4. An apparatus as in claims 1 or 2, wherein said cyclone tube projects through a top wall of said take-up container, and said outlet stack is mounted above the top wall of said take-up container on said separating wall covering said cyclone tube.

5. An apparatus as in claims 1 or 2, wherein said stack gas inlet duct opens into said cyclone tube directly below said separating wall and said cleaned gas ducts open into said outlet stack directly above said separating wall.

6. An apparatus as in claims 1 or 2, wherein said cleaned gas ducts are placed radially around said take-up container and curve upwards and inwards to said stack.

7. An apparatus for the separation of suspended materials such as ashes from hot stack gases comprising a stack gas inlet duct opening into a cyclone-like separator, a suspended material take-up container, a fines separator and an outlet stack for cleaned stack gas, wherein said cyclone-like separator, said fines separator, and said outlet stack form an integral structural unit, and said take-up container functions as a support for said structural unit; and wherein (a) said cyclone-like separator is a vertically oriented cyclone tube, the lower portion of which is placed within the center of said take-up container; said cyclone tube having on outlet opening at its bottom;

(b) said fines separator is arranged concentrically around said lower portion of said cyclone tube and has a partially-cleaned-gas inlet at a higher level than the outlet opening of said cyclone tube into said take-up container;

(c) said outlet stack is mounted upon a separating wall covering the top of the upper portion of said cyclone tube above said take-up container, and connected through ducts with a cleaned gas end of said fines separator;

said take-up container being adapted to accumulate heat from said suspended materials separated by said cyclone tube and to transfer said heat to said integral structural unit whereby the temperature of the stack gas within said apparatus is maintained above the dew point, thereby preventing sooting-up within said apparatus.

8. The apparatus according to claim 7, wherein said stack gas inlet duct opens into said portion of said cyclone tube immediately below said separating wall, where the diameter of said cyclone tube is markedly larger than that of said stack inlet duct opening into it.

9. The apparatus according to claim 8, wherein said ducts connecting said fines separator to said outlet stack open into said outlet stack immediately above said separating wall.

10. The apparatus according to claim 9, wherein said ducts are placed radially around said take-up container and curve upwards and inwards to said outlet stack.

11. The apparatus according to claim 8, wherein said ducts connecting said fines separator to said outlet stack are placed radially around said take-up container and curve upwards and inwards to said outlet stack.

* * * * *